US012560853B2

(12) United States Patent (10) Patent No.: US 12,560,853 B2
Wu et al. (45) Date of Patent: Feb. 24, 2026

(54) OPTICAL ELEMENT DRIVING MECHANISM

(71) Applicant: TDK TAIWAN CORP., Taoyuan City (TW)

(72) Inventors: Ya-Hsiu Wu, Taoyuan City (TW); Ying-Jen Wang, Taoyuan City (TW); Sin-Jhong Song, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 402 days.

(21) Appl. No.: 18/089,208

(22) Filed: Dec. 27, 2022

(65) Prior Publication Data

US 2023/0205049 A1 Jun. 29, 2023

Related U.S. Application Data

(60) Provisional application No. 63/266,034, filed on Dec. 27, 2021.

(51) Int. Cl.
| | |
|---|---|
| *G03B 5/00* | (2021.01) |
| *G02B 7/08* | (2021.01) |
| *G02B 26/08* | (2006.01) |
| *G02B 27/00* | (2006.01) |
| *G02B 27/64* | (2006.01) |
| *H02K 41/035* | (2006.01) |
| *H04N 23/51* | (2023.01) |
| *H04N 23/55* | (2023.01) |
| *H04N 23/68* | (2023.01) |

(52) U.S. Cl.
CPC ................. *G03B 5/00* (2013.01); *G02B 7/08* (2013.01); *G02B 26/08* (2013.01); *G02B 27/0006* (2013.01); *G02B 27/646* (2013.01); *H04N 23/55* (2023.01); *H04N 23/6812* (2023.01); *H04N 23/687* (2023.01); *G03B 2205/0015* (2013.01); *G03B 2205/0069* (2013.01); *H02K 41/0354* (2013.01); *H04N 23/51* (2023.01)

(58) Field of Classification Search
CPC .............. G02B 26/0816; G02B 26/085; G02B 26/0875; G02B 7/18; G02B 7/1805; G02B 7/182; G02B 7/1821; G02B 13/0065; G03B 5/00; G03B 2205/0023; G03B 2205/0069
See application file for complete search history.

(56) References Cited

U.S. PATENT DOCUMENTS

| | | | | |
|---|---|---|---|---|
| 2011/0122267 A1* | 5/2011 | Ahn | ..................... | H04N 23/687 |
| | | | | 348/208.7 |
| 2018/0203328 A1* | 7/2018 | Kang | ........................ | G02B 7/04 |
| 2018/0329276 A1* | 11/2018 | Hu | ........................ | G03B 17/17 |
| 2020/0225442 A1* | 7/2020 | Weng | ................ | G02B 27/0068 |
| 2021/0208363 A1* | 7/2021 | Kuo | ................... | H02K 41/0356 |
| 2021/0389551 A1* | 12/2021 | Jang | ........................ | G03B 30/00 |
| 2022/0082786 A1* | 3/2022 | Chang | ....................... | G02B 7/08 |
| 2022/0299730 A1* | 9/2022 | Jang | .......................... | G03B 5/00 |

* cited by examiner

*Primary Examiner* — Bumsuk Won
*Assistant Examiner* — Alex Park Rickel
(74) *Attorney, Agent, or Firm* — MUNCY, GEISSLER, OLDS & LOWE, P.C.

(57) ABSTRACT

An optical element driving mechanism used for driving an optical element is provided. The optical element driving mechanism includes a fixed portion and a driving assembly. The driving assembly is used for driving the optical element to move relative to the fixed portion in a first dimension.

22 Claims, 11 Drawing Sheets

100

250

252

253

254

255

251

Z

Y

X

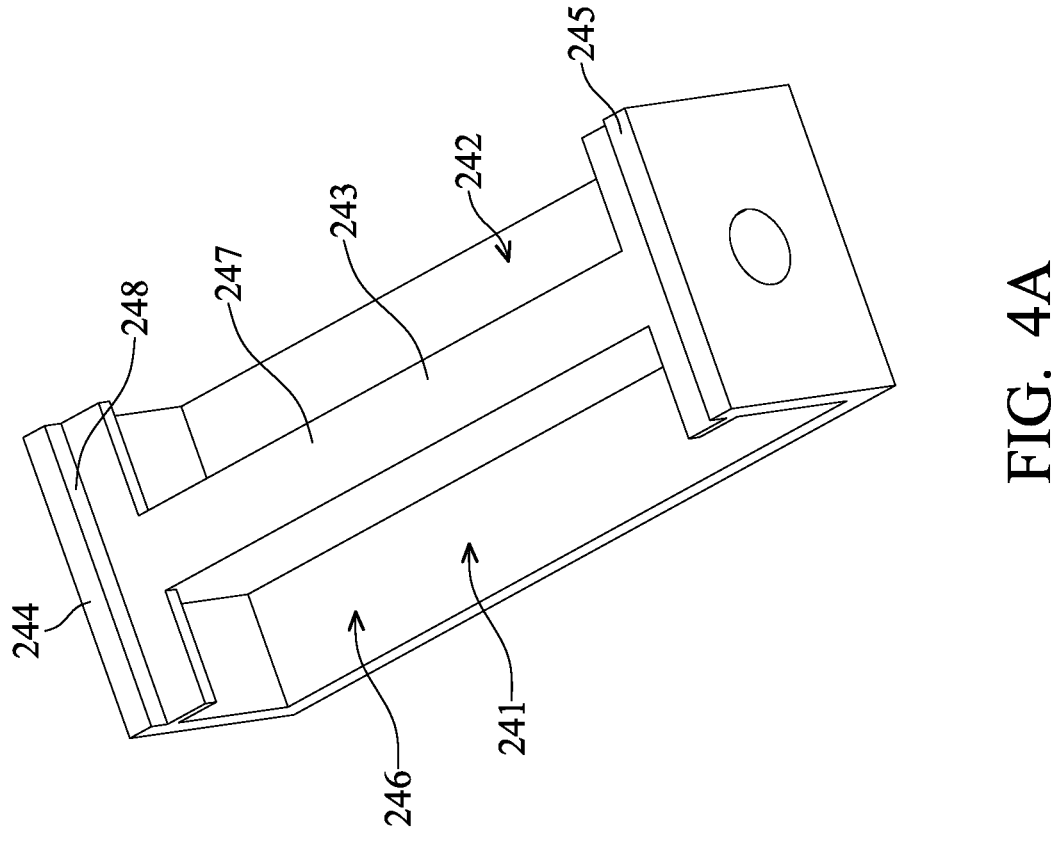
240
248
247
243
242
245
244
246
241
FIG. 4A
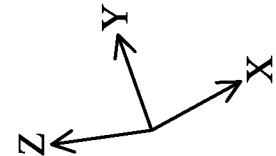
Y
X
Z

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism used for driving an optical element is provided in some embodiments of the present disclosure. The optical element driving mechanism includes a fixed portion and a driving assembly. The driving assembly is used for driving the optical element to move relative to the fixed portion in a first dimension In some embodiments, the driving assembly includes a coil, a first magnetic element corresponding to the coil, and a second magnetic element corresponding to the coil. The optical element driving mechanism further includes a movable portion which is movable relative to the fixed portion. The optical element is disposed on the movable portion. An N pole and a S pole of the first magnetic element are arranged in a first pole direction.

In some embodiments, the first dimension is rotation relative to a rotational axis. The rotational axis is parallel to the first axis. The first pole direction is perpendicular to the first axis. At least a portion of the first magnetic element overlaps rotational axis when viewed in a first pole direction. The first magnetic element and the second magnetic element are arranged in the first pole direction. The rotational axis is between the first magnetic element and the second magnetic element.

In some embodiments, a winding axis of the coil is perpendicular to the first axis. The winding axis is perpendicular to the first axis and a second axis. The second axis is perpendicular to the first axis. The winding axis is parallel to a third axis. The coil surrounds the first magnetic element when viewed along the third axis. The coil surrounds the second magnetic element when viewed along the third axis.

In some embodiments, at least a portion of the coil overlaps the first magnetic element in a direction that the second axis extends. At least a portion of the coil overlaps the second magnetic element in a direction that the second axis extends.

In some embodiments, the fixed portion includes a bottom surface having a planar structure and facing an external device, a first surface facing the driving assembly, a first accommodating portion used for accommodating at least a portion of the movable portion, and a first disposing portion corresponding to the coil.

In some embodiments, the first surface is not parallel to the bottom surface. The first surface is not perpendicular to the bottom surface. The first accommodating portion is formed on the first surface. The first disposing portion protrudes from the first surface. At least a portion of the coil overlaps the first disposing portion when viewed along the third axis.

In some embodiments, the driving assembly further includes a first magnetic permeable element corresponding to the first magnetic element, a second magnetic permeable element corresponding to the second magnetic element, and a third magnetic permeable element being plate-shaped.

In some embodiments, at least a portion of the first magnetic permeable element overlaps the first magnetic element in the direction that the second axis extends. At least a portion of the first magnetic permeable element overlaps the coil in the direction that the second axis extends. The first magnetic permeable element is plate-shaped. The first magnetic permeable element includes a protruding portion extending in the direction that the first axis extends.

In some embodiments, the second magnetic permeable element is plate-shaped. The third magnetic permeable element is between the first magnetic permeable element and the second magnetic permeable element. The first magnetic permeable element is affixed to the second magnetic permeable element through the third magnetic permeable element.

In some embodiments, the first magnetic permeable element, the second magnetic permeable element, and the third magnetic permeable element are integrally formed as one piece. The third magnetic permeable element is in the first accommodating portion. The third magnetic permeable element has a third magnetic permeable element surface facing the movable portion.

In some embodiments, at least a portion of a first segment of the coil does not overlap the third magnetic permeable element when viewed in a direction that the third axis extends. The first segment extends in a direction that is not parallel to the first axis. A shortest distance between the third magnetic permeable element surface and the coil is different from a shortest distance between the first magnetic permeable element and the coil. At least a portion of the first magnetic permeable element protrudes from the coil in the direction that the third axis extends.

In some embodiments, the optical element driving mechanism further includes a support assembly. The movable portion is movable relative to the fixed portion through the support assembly. The support assembly is movable relative to the movable portion or the fixed portion. The fixed portion further includes a first supporting portion corresponding to the support assembly. At least a portion of the first magnetic permeable element overlaps the first supporting portion in the direction that the second axis extends. The coil surrounds the first supporting portion when viewed along the third axis.

In some embodiments, the first supporting portion protrudes from the first surface. The first supporting portion is adjacent to the first disposing portion. A maximum length of the first supporting portion is greater than a maximum length of the first disposing portion in the direction that the third axis extends. A first supporting portion surface of the first supporting portion is not parallel to a first disposing portion surface of the first disposing portion. The first supporting portion surface of the first supporting portion is not perpendicular to the first disposing portion surface of the first disposing portion.

In some embodiments, at least a portion of the coil overlaps the support assembly in the direction that the second axis extends. A shortest distance between the third magnetic permeable element surface and the coil is greater than a shortest distance between the first magnetic permeable element and the coil.

In some embodiments, the movable portion includes a first recess, a second recess, a first top wall corresponding to the first magnetic element, a second top wall protruding from the first top wall, a third top wall protruding from the first top wall, and a first exposing portion formed on the first top wall. The first magnetic element is disposed in the first recess. The second magnetic element is disposed in the second recess.

In some embodiments, the optical element is disposed on the first top wall. A first top wall surface of the first top wall faces the optical element. A second top wall surface of the second top wall faces the optical element. A third top wall surface of the third top wall faces the optical element.

In some embodiments, the first top wall surface and the second top wall surface face different directions. The third top wall surface and the second top wall surface face opposite directions. At least a portion of the movable portion overlaps the optical element in the direction that the first axis extends. The movable portion does not overlap the optical element in the direction that the second axis extends.

In some embodiments, the first exposing portion has an opening structure. At least a portion of the first magnetic element is exposed from the first exposing portion.

In some embodiments, wherein the movable portion further includes a first adhesive element, and the optical element is affixed on the movable portion through the first adhesive element. The first adhesive element is in direct contact with the first top wall. The first adhesive element is in direct contact with the first magnetic element. The first adhesive element is in direct contact with the optical element.

In some embodiments, at least a portion of the first adhesive element is disposed on the first exposing portion. The first top wall surface is perpendicular to the second top wall surface.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4A and FIG. 4B are schematic views when the movable portion is viewed from different directions.

DETAILED DESCRIPTION OF THE INVENTION

Figure 1A:
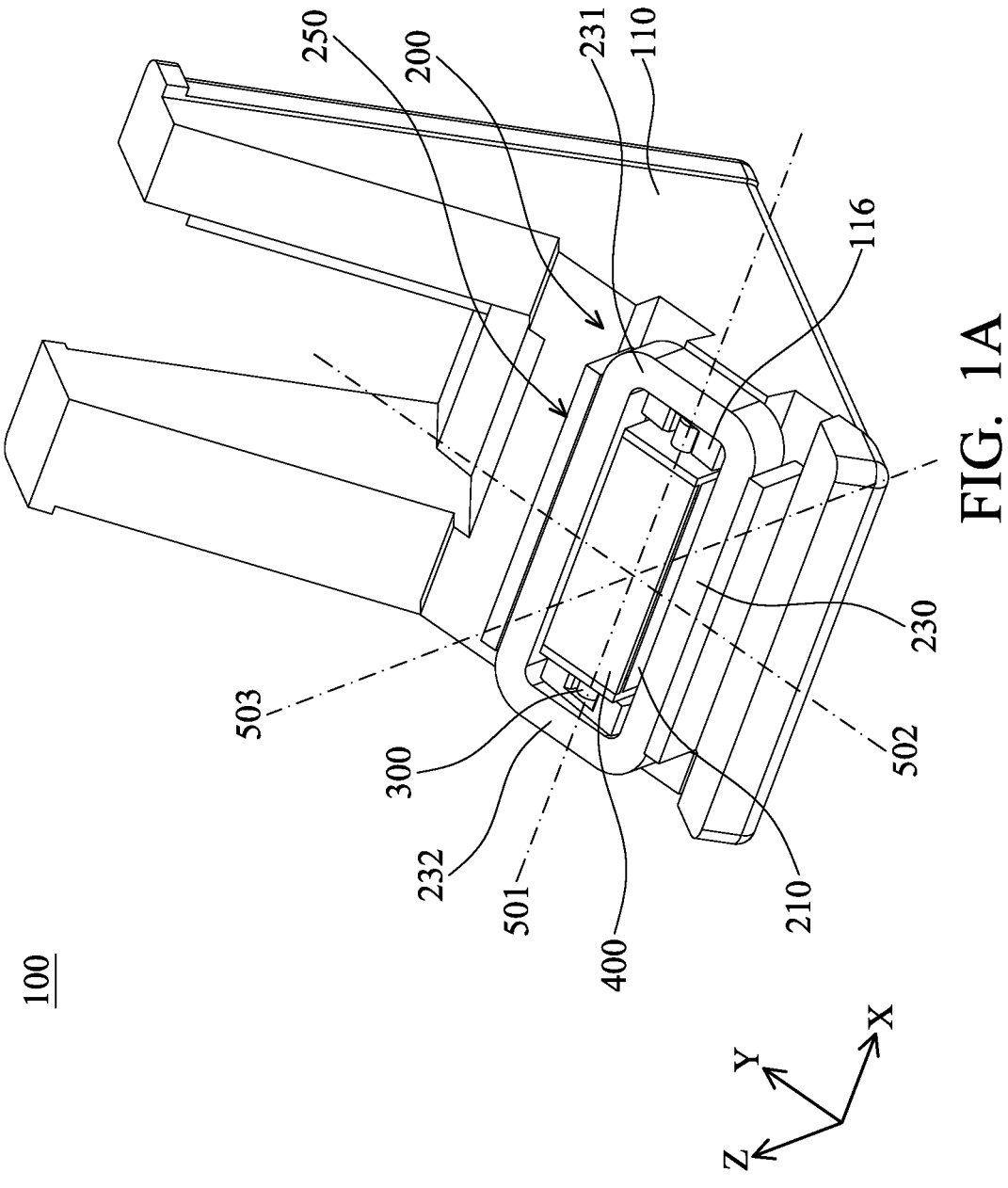
FIG. 1A and FIG. 1B are schematic views of an optical element driving mechanism viewed from different directions in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
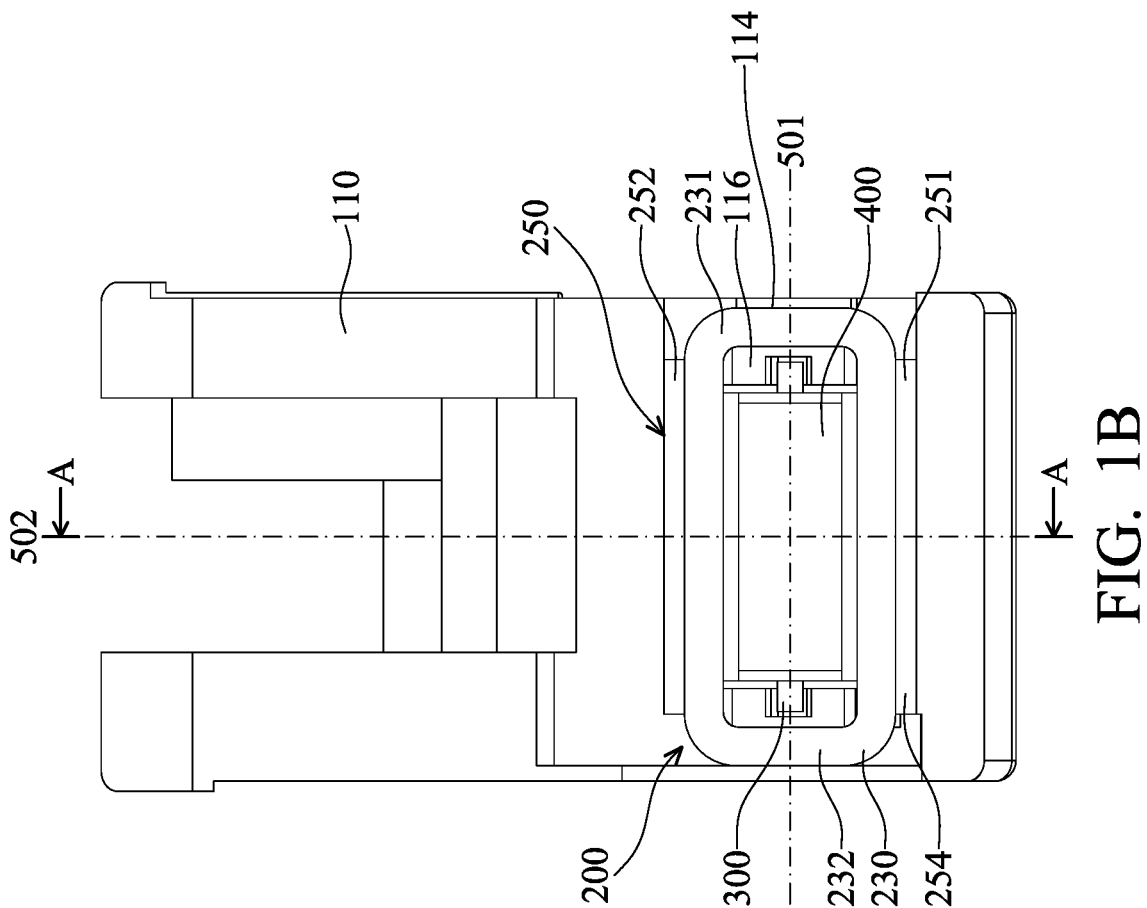
Figure 1B:
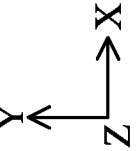
Figure 1C:
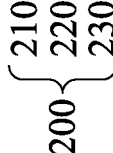
FIG. 1C is a cross-sectional view illustrated along a section A-A in FIG. 1B.
Figure 1C:
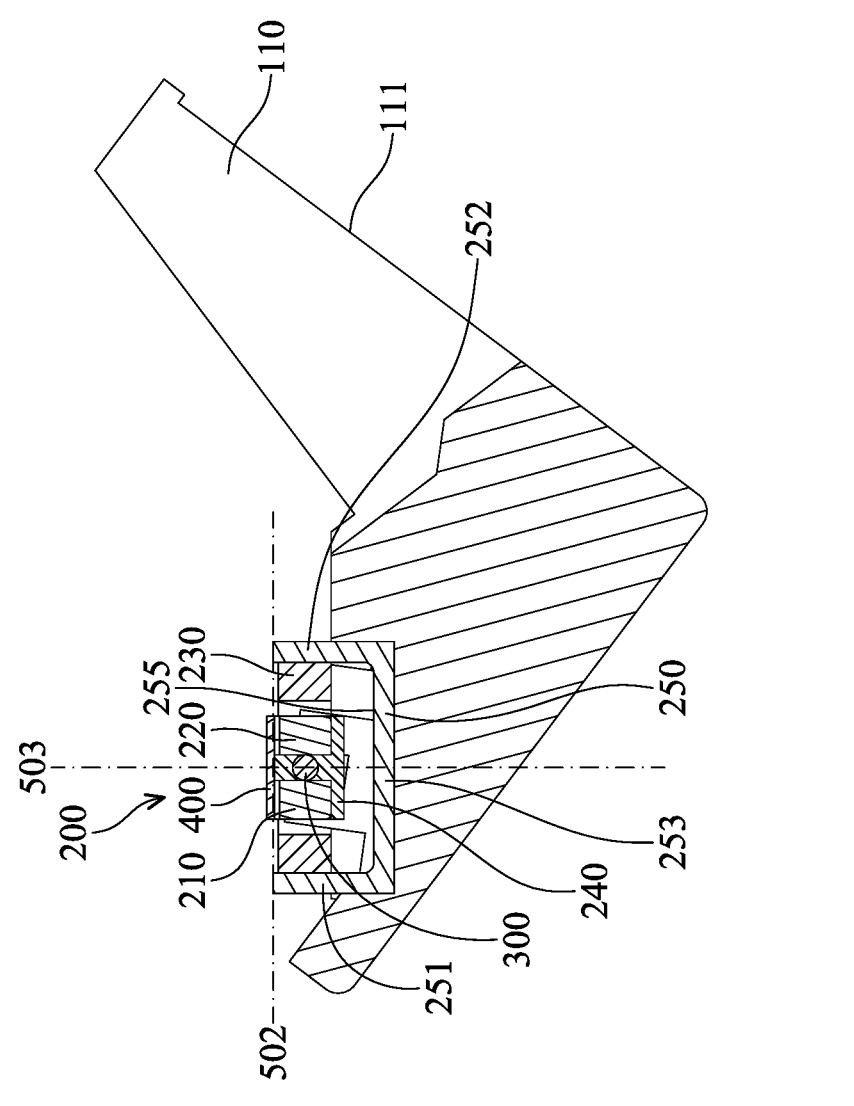

FIG. 1A and FIG. 1B are schematic views of an optical element driving mechanism 100 viewed from different directions in some embodiments of the present disclosure. FIG. 1C is a cross-sectional view illustrated along a section A-A in FIG. 1B. The optical element driving mechanism 100 may include a fixed portion 110, a driving assembly 200, a movable portion 240, a support assembly 300, and may use for driving a optical element 400.

In some embodiments, the optical element 400 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g., infrared or ultraviolet) are also included in the present disclosure. Therefore, the type and function of the optical element 400 may be different, and suitable optical element 400 may be chosen based on actual requirement.

In some embodiments, the driving assembly 200 and the support assembly 300 may be disposed on the fixed portion 110, and the driving assembly 200 may include a first magnetic element 210, a second magnetic element 220, and a coil 230. The first magnetic element 210 and the second magnetic element 220 may correspond to the coil 230. The driving assembly 200 may be used to drive the movable portion 240 to move relative to the fixed portion 110, and the optical element 400 may be disposed on the movable portion 240 to move together with the movable portion 240. Therefore, the direction of the light incident on the optical element 400 may be changed to achieve detection, scanning, projection and other functions.

In some embodiments, a first axis 501 may be defined as an axis extending in the X direction, a second axis 502 may be defined as an axis extending in the Y direction, and a third axis 503 may be defined as an axis extending in the Z direction. The driving assembly 200 may be used to drive the optical element 400 to move relative to the fixed portion 110 in a first dimension, and the first dimension refers to a rotation relative to a rotational axis, and the rotational axis is parallel to the first axis 501, such as an axis passing through the support assembly 300. In addition, a winding axis of the coil 230 may be perpendicular to the first axis 501 and the second axis 502 and parallel to the third axis 503.

In some embodiments, the movable portion 240 may move relative to the fixed portion 110 via the support assembly 300, for example, the support assembly 300 may pass through the movable portion 240, and the support assembly 300 may move relative to the movable portion 240 or the fixed portion 110.

Figure 2:
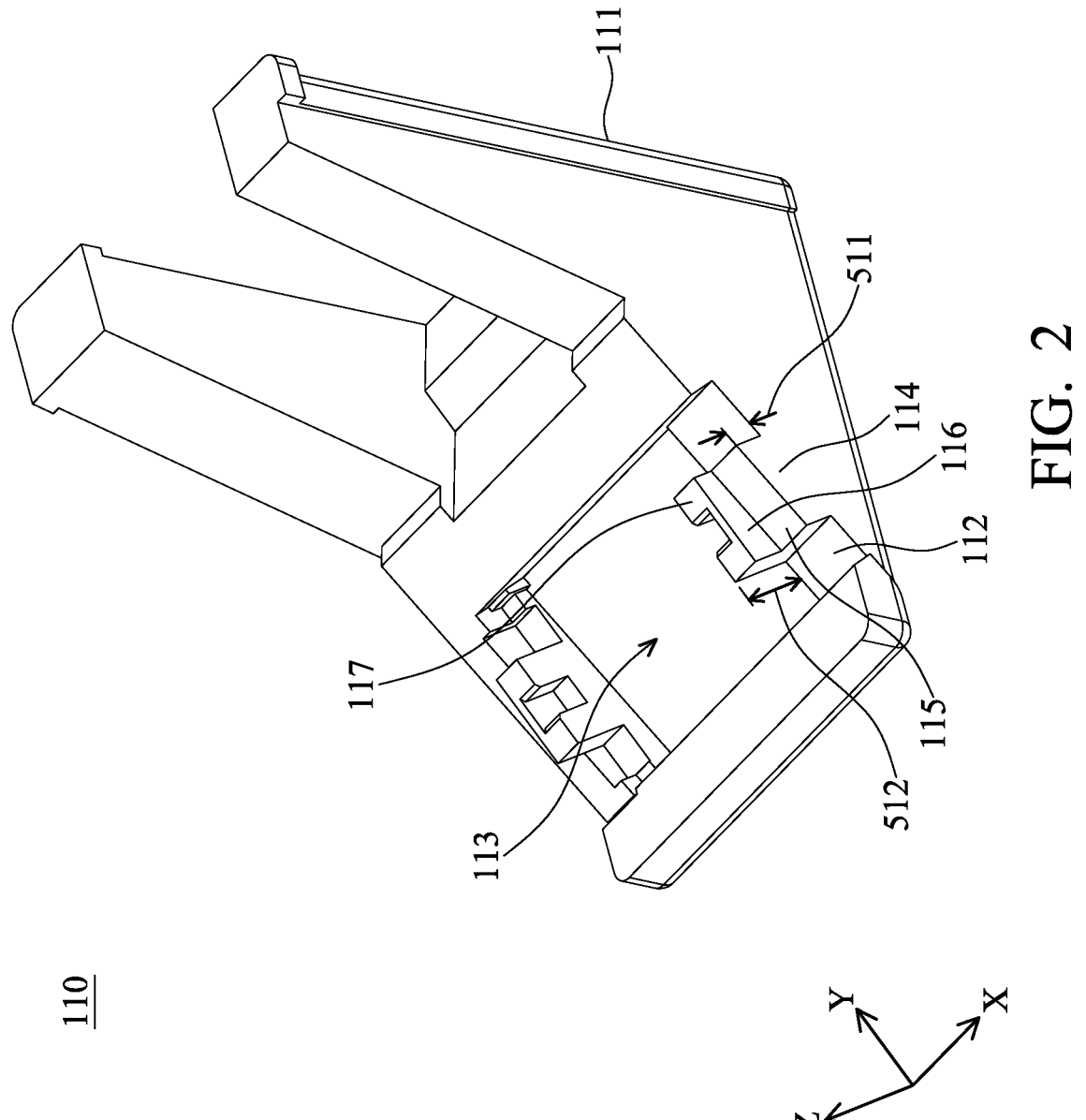
FIG. 2 is a schematic view of the fixed portion.

FIG. 2 is a schematic view of the fixed portion 110. In some embodiments, the fixed portion 110 may include a bottom surface 111, a first surface 112, a first accommodating portion 113, a first disposing portion 114, and a first supporting portion 116. The bottom surface 111 may have a planar structure and face external devices (not shown, such as mobile phone substrates, portable device casings, production equipment, etc.), and the first surface 112 may face the driving assembly 200. The first accommodating portion 113 may accommodate at least a portion of the movable portion 240 to provide space for the movable portion 240 to move. The first disposing portion 114 may correspond to the coil 230, for example, the first disposing portion 114 may directly contact the coil 230 and may at least partially overlap the coil 230 in the Z direction, so the coil 230 may be disposed on the first disposing portion 114.

In some embodiments, the bottom surface 111 and the first surface 112 may face in different directions, for example, the bottom surface 111 and the first surface 112 are neither perpendicular nor parallel. In addition, the first accommodating portion 113 may be formed on the first surface 112, and the first disposing portion 114 may protrude from the first surface 112.

In some embodiments, the first supporting portion 116 may correspond to the support assembly 300, such as the support assembly 300 may be disposed in the first supporting portion 116. For example, as shown in FIG. 1A, in the direction that the second axis 502 extends (Y direction), the first magnetic permeable element 251 and the first supporting portion 116 may at least partially overlap each other. In addition, as shown in FIG. 1B, the coil 230 may surround the first supporting portion 116 when viewed along the third axis 503. In some embodiments, the first supporting portion 116 may protrude from the first surface 112 and be adjacent to the first disposing portion 114. For example, as shown in FIG. 2, in the direction in which the third axis 503 extends (Z direction), a maximum length 511 of the first disposing portion 114 may be less than a maximum length 512 of the first supporting portion 116. In some embodiments, the first disposing portion 114 may have a first disposing portion surface 115, the first supporting portion 116 may have a first supporting portion surface 117, and the first disposing portion surface 115 and the first supporting portion surface 117 are not parallel or perpendicular to each other. In this way, the movable portion 240 is allowed to be movably connected to the fixed portion 110 through the support assembly 300, so as to be rotated by taking the support assembly 300 as a rotational axis.

Figure 3:
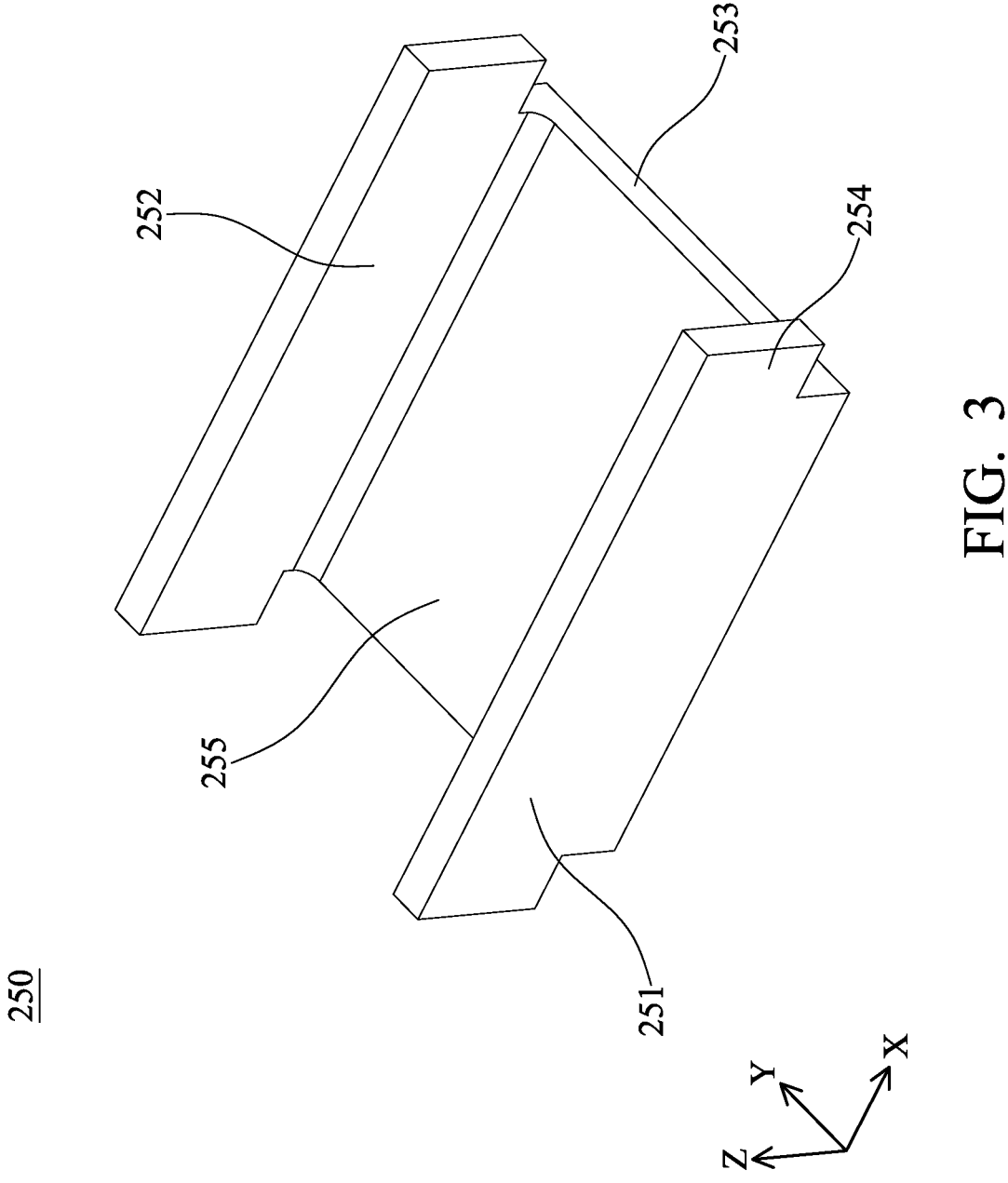
FIG. 3 is a schematic view of the magnetic permeable assembly.

FIG. 3 is a schematic view of the magnetic permeable assembly 250. In some embodiments, the magnetic permeable assembly 250 may include a first magnetic permeable element 251, a second magnetic permeable element 252, and a third magnetic permeable element 253. The first magnetic permeable element 251, the second magnetic permeable element 252, and the third magnetic permeable element 253 may be plate-shaped and may be integrally formed as one piece. The first magnetic permeable element 251 may correspond to the first magnetic element 210, and the second magnetic permeable element 252 may correspond to the second magnetic element 220, such as at least partially overlapping each other in the direction in which the second axis 502 extends (Y direction). The third magnetic permeable element 253 may be located between the first magnetic permeable element 251 and the second magnetic permeable element 252, such as the first magnetic permeable element 251 is affixed on the second magnetic permeable element 252 via the third magnetic permeable element 253. In addition, the third magnetic permeable element 253 may be located in the first accommodating portion 113, and the third magnetic permeable element 253 may at least partially overlap the first magnetic element 210 and the second magnetic element 220 in the Z direction. In some embodiments, the magnetic permeable assembly 250 may be made of magnetic material, and may be used to guide the magnetic field of the first magnetic element 210 and the second magnetic element 220. For example, the magnetic permeable assembly 250 may change the strength and direction of the magnetic field, so that the magnetic permeable assembly 250 may be used to control the movement and precision of the optical element 400.

In some embodiments, in the direction in which the second axis 502 extends (Y direction), the first magnetic permeable element 251, the second magnetic permeable element 252, and the coil 230 may at least partially overlap each other. In some embodiments, the first magnetic permeable element 251 may have a protruding portion 254 extending along the direction in which the first axis 501 extends (X direction) and adjacent to the coil 230 to concentrate and strengthen the action of the magnetic lines of force. In some embodiments, the third magnetic permeable element 253 may have a third magnetic element surface 255 facing the movable portion 240.

Figure 4B:
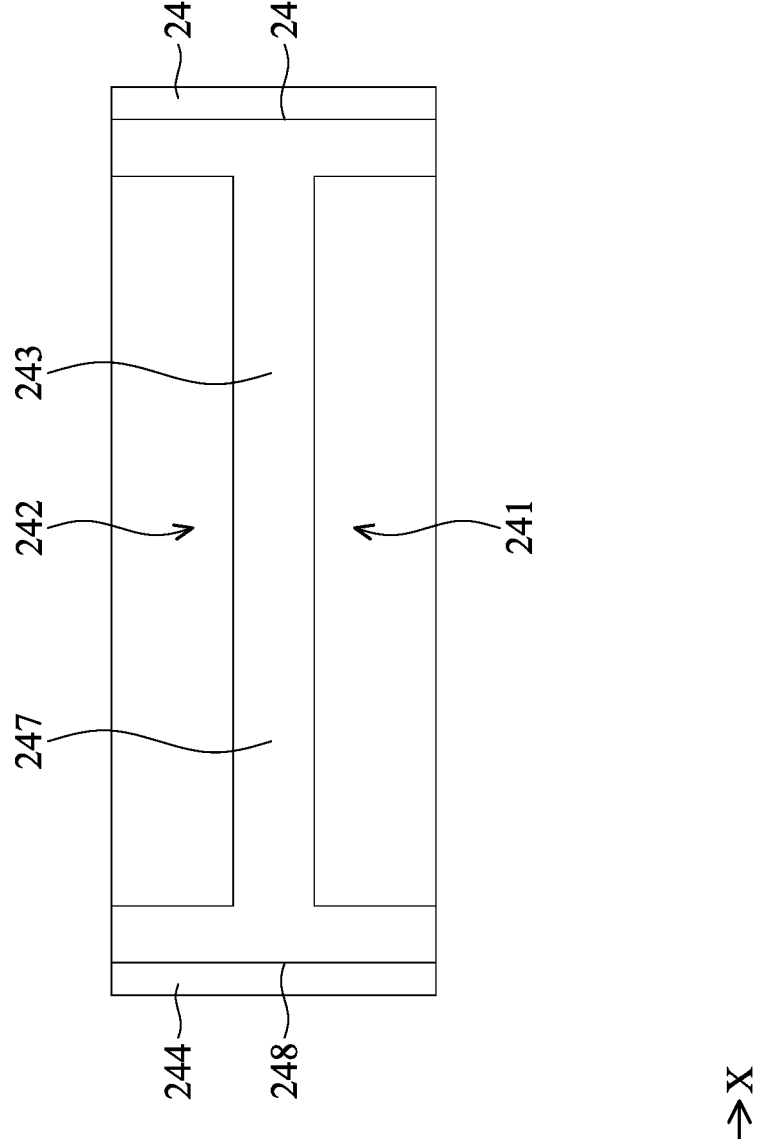
Figure 5A:
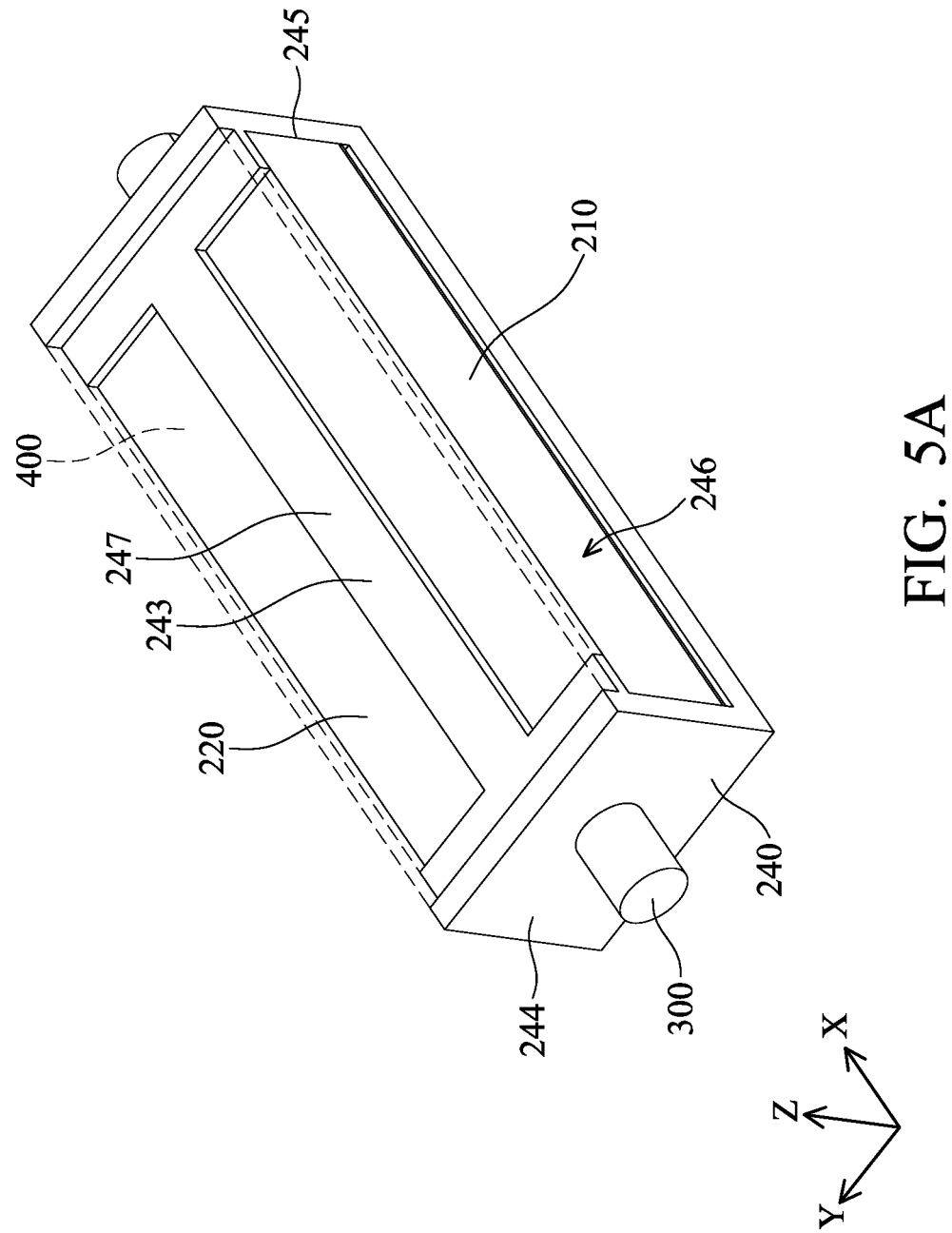
FIG. 5A and FIG. 5B are schematic views when some elements of the optical element driving mechanism are viewed from different directions.
Figure 5B:
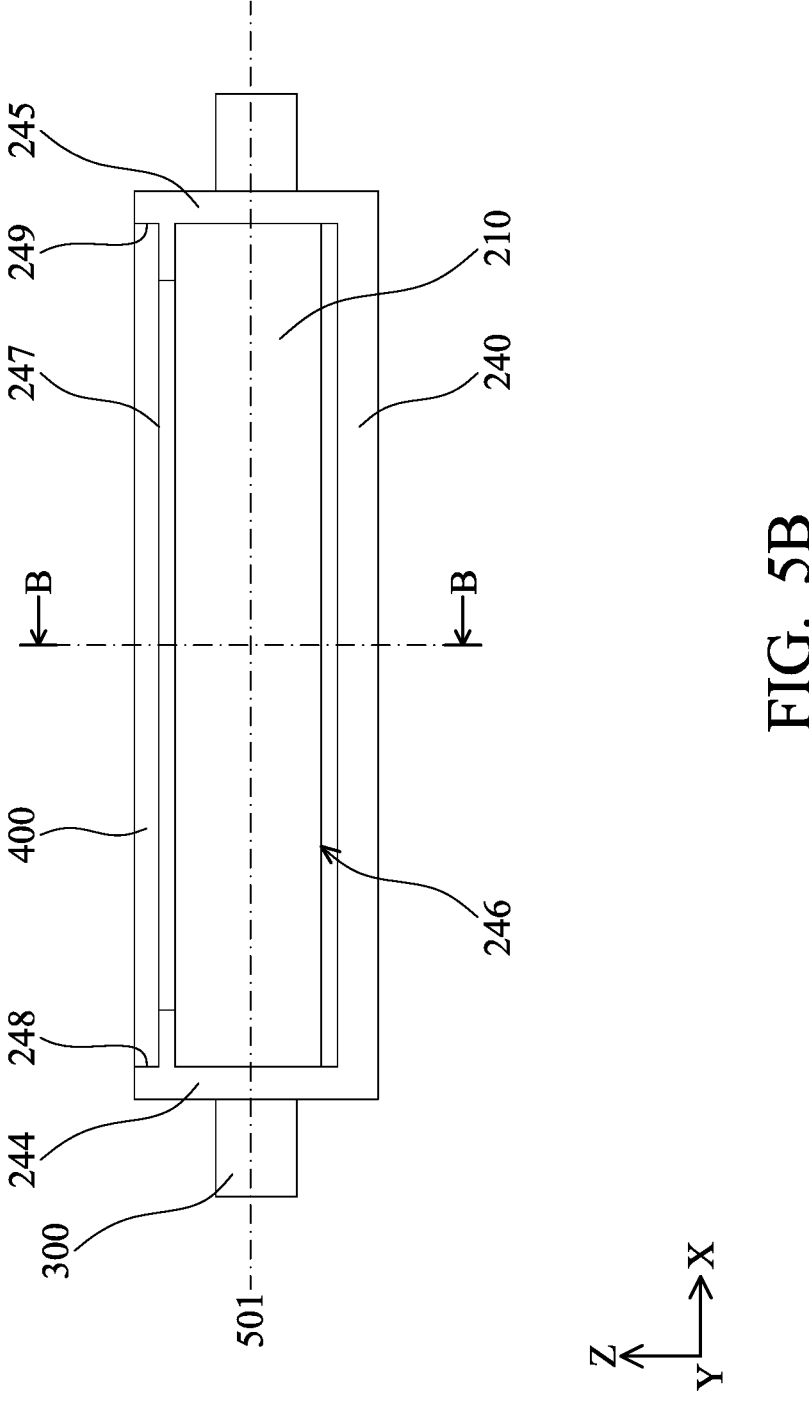
Figure 5C:
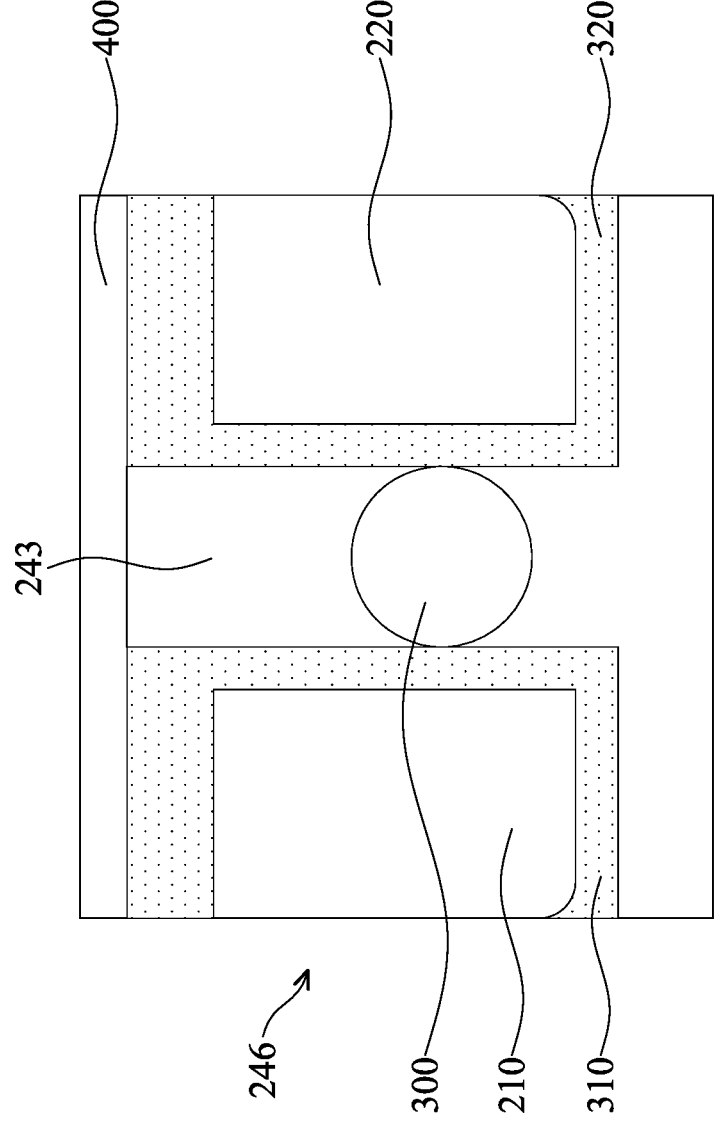
FIG. 5C is a schematic view illustrated along a section B-B of FIG. 5B.
Figure 5C:
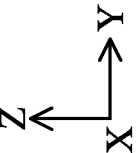

FIG. 4A and FIG. 4B are schematic views when the movable portion 240 is viewed from different directions. FIG. 5A and FIG. 5B are schematic views when some elements of the optical element driving mechanism 100 are viewed from different directions. FIG. 5C is a schematic view illustrated along a section B-B of FIG. 5B.

As shown in FIG. 4A to FIG. 5B, the movable portion 240 may include a first recess 241, a second recess 242, a first top wall 243, a second top wall 244, a third top wall 245, and a first exposing portion 246. The first recess 241 and the second recess 242 may be disposed on opposite sides of the first top wall 243, the first magnetic element 210 may be disposed in the first recess 241, and the second magnetic element 220 may be disposed in the second recess 242. That is to say, the first top wall 243 may correspond to the first magnetic element 210 and the second magnetic element 220.

In some embodiments, the second top wall 244 and the third top wall 245 may protrude from the first top wall 243. The optical element 400 may be disposed on the first top wall 243, the first top wall 243 may have a first top wall surface 247 facing the optical element 400, the second top wall 244 may have a second top wall surface 248 facing the optical element 400, and the third top wall 245 may have a third top wall surface 249 facing the optical element 400.

In some embodiments, the first top wall surface 247, the second top wall surface 248, and the third top wall surface 249 may face in different directions, such as the first top wall surface 247 may be perpendicular to the second top wall surface 248 and the third top wall surface 249, and the second top wall surface 248 and the third top wall surface 249 may face opposite directions. In some embodiments, in a direction that the first axis 501 extends (X direction), the movable portion 240 and the optical element 400 may at least partially overlap each other. In a direction that the second axis 502 extends, the movable portion 240 do not overlap the optical element 400.

In some embodiments, a first exposing portion 246 may be formed on the first top wall 243 and may have an opening structure, so that the first magnetic element 210 may be at least partially exposed from the first exposing portion 246.

In some embodiments, as shown in FIG. 5C, the movable portion 240 may further include a first adhesive element 310 and a second adhesive element 320. The first adhesive element 310 and the second adhesive element 320 may be glue, for example, and may directly contact the first top wall 243 and the optical element 400, the first adhesive element 310 may directly contact the first magnetic element 210, and the second adhesive element 320 may be in direct contact with the second magnetic element 220. The first adhesive element 310 may be partially disposed on the first exposing portion 246 to fix relative positions of the first magnetic element 210, the second magnetic element 220, the movable portion 240, and the optical element 400.

Figure 6:
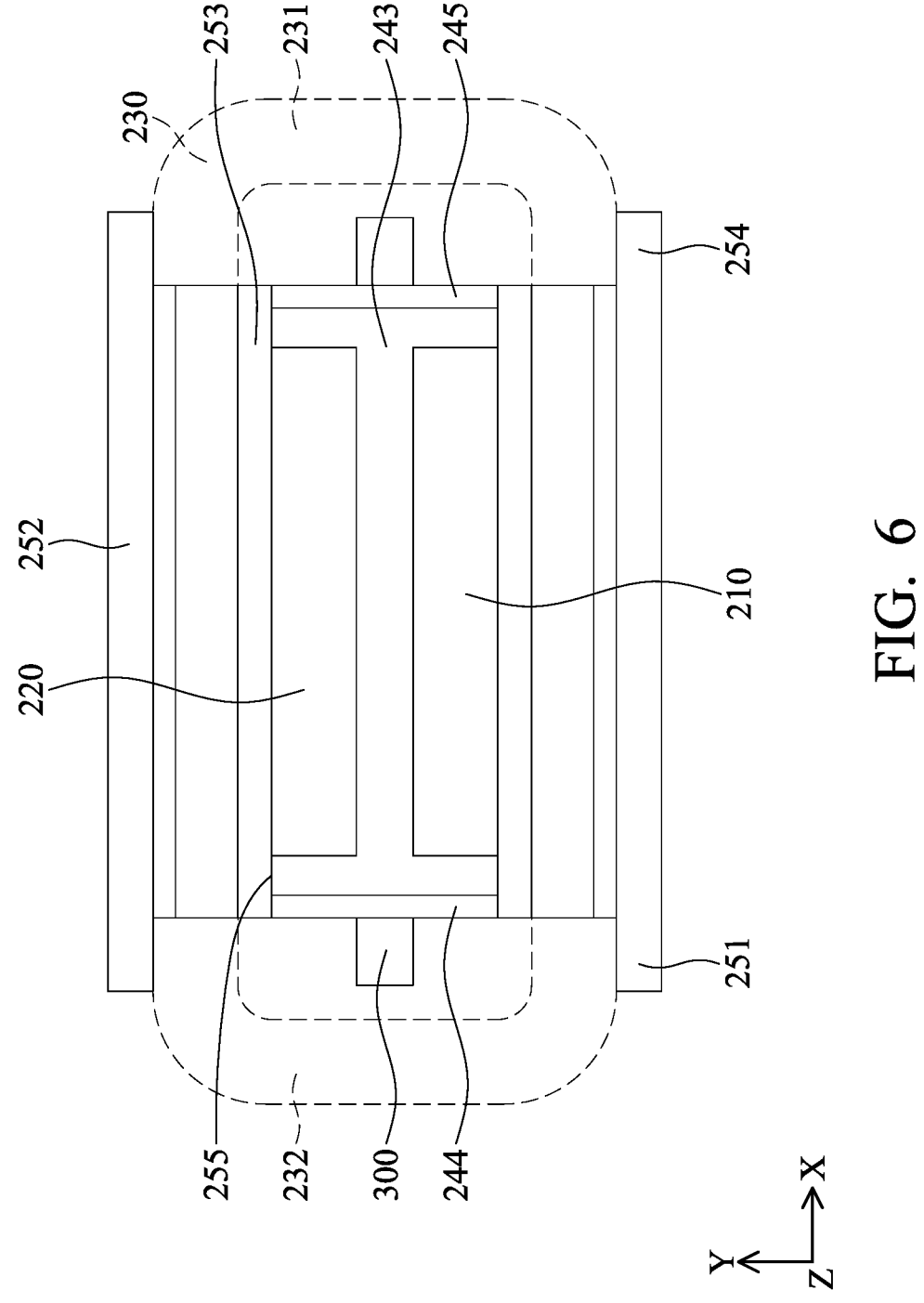
FIG. 6 is a schematic view of some elements of the optical element driving mechanism.

FIG. 6 is a schematic view of some elements of the optical element driving mechanism 100. As shown in FIG. 6, the coil 230 may have a first segment 231 and a second segment 232 extending in the Y direction, that is, not parallel to the direction in which the first axis 501 extends (X direction). The coil 230 may surround the first magnetic element 210 and the second magnetic element 220. When viewed along the direction along which the third axis 503 extends (Z direction), the first segment 231, the second segment 232, and the third magnetic permeable element 253 may at least partially not overlap each other.

As shown in FIG. 1C, the first magnetic permeable element 251 and the second magnetic permeable element 252 may directly contact the coil 230, and a third magnetic element surface 255 of the third magnetic permeable element 253 may be separated from the coil 230, so the shortest distance between the third magnetic element surface 255 and the coil 230 is different from the shortest distance between the first magnetic permeable element 251 and the coil 230. For example, the shortest distance between the third magnetic element surface 255 and the coil 230 may be greater than that of the first magnetic permeable element 251 and the coil 230. In some embodiments, the first magnetic element 210, the second magnetic element 220, the coil 230, and the support assembly 300 may at least partially overlap each other in the direction in which the second axis 502 extends. In the direction in which the third axis 503 extends, the first magnetic permeable element 251 may at least partially protrude from the coil 230.

In some embodiments, an N pole and a S pole of the first magnetic element 210 may be arranged along a first pole direction (for example, the Y direction), and the first pole direction may be perpendicular to the first axis 501. When viewed along the first pole direction, the first axis 501 at least partially overlaps with the rotational axis of the optical element driving mechanism 100 (for example, the axis extending in the X direction and passing through the support assembly 300). The first magnetic element 210 and the second magnetic element 220 may be arranged along the first pole direction, and the rotational axis may be located between the first magnetic element 210 and the second magnetic element 220. Thereby, when the movable portion 240 and the optical element 400 are rotating, the first magnetic element 210 and the second magnetic element 220 may provide electromagnetic driving force to rotate the movable portion 240 and the optical element 400 relative to the rotational axis.

In summary, an optical element driving mechanism used for driving an optical element is provided. The optical element driving mechanism includes a fixed portion and a driving assembly. The driving assembly is used for driving the optical element to move relative to the fixed portion in a first dimension. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism used for driving an optical element, comprising:
 a fixed portion;
 a movable portion movable relative to the fixed portion and comprising a first top wall, a second top wall protruding from the first top wall, and a third top wall protruding from the first top wall, wherein the optical element is disposed on the first top wall of the movable portion, a first top wall surface of the first top wall faces the optical element, a second top wall surface of the second top wall faces the optical element, and a third top wall surface of the third top wall faces the optical element; and
 a driving assembly used for driving the optical element to move relative to the fixed portion in a first dimension, wherein the first dimension is rotation relative to a rotational axis parallel to a first axis,
 wherein the driving assembly comprises:
 a coil;
 a first magnetic element corresponding to the coil; and
 a second magnetic element corresponding to the coil, wherein the first top wall is disposed between the first magnetic element and the second magnetic element;
 wherein:
 the coil, the first magnetic element, and the second magnetic element are arranged in a second axis;
 the coil and the optical element are arranged in a third axis; and
 the first axis, the second axis, and the third axis are mutually perpendicular.

2. The optical element driving mechanism as claimed in claim 1, wherein
 an N pole and a S pole of the first magnetic element are arranged in a first pole direction that is parallel to the second axis.

3. The optical element driving mechanism as claimed in claim 2, wherein:
 the first pole direction is perpendicular to the first axis;
 at least a portion of the first magnetic element overlaps rotational axis when viewed in a first pole direction;
 the first magnetic element and the second magnetic element are arranged in the first pole direction; and
 the rotational axis is between the first magnetic element and the second magnetic element.

4. The optical element driving mechanism as claimed in claim 3, wherein:

a winding axis of the coil is perpendicular to the first axis;
 the winding axis is perpendicular to the first axis and the second axis;
 the winding axis is parallel to the third axis;
 the coil surrounds the first magnetic element when viewed along the third axis; and
 the coil surrounds the second magnetic element when viewed along the third axis.

5. The optical element driving mechanism as claimed in claim 4, wherein:
 at least a portion of the coil overlaps the first magnetic element in a direction that the second axis extends; and
 at least a portion of the coil overlaps the second magnetic element in a direction that the second axis extends.

6. The optical element driving mechanism as claimed in claim 5, wherein the fixed portion comprises:
 a bottom surface having a planar structure and facing an external device;
 a first surface facing the driving assembly;
 a first accommodating portion used for accommodating at least a portion of the movable portion; and
 a first disposing portion corresponding to the coil.

7. The optical element driving mechanism as claimed in claim 6, wherein:
 the first surface is not parallel to the bottom surface;
 the first surface is not perpendicular to the bottom surface;
 the first accommodating portion is formed on the first surface;
 the first disposing portion protrudes from the first surface; and
 at least a portion of the coil overlaps the first disposing portion when viewed along the third axis.

8. The optical element driving mechanism as claimed in claim 7, wherein the driving assembly further comprises:
 a first magnetic permeable element corresponding to the first magnetic element;
 a second magnetic permeable element corresponding to the second magnetic element; and
 a third magnetic permeable element being plate-shaped.

9. The optical element driving mechanism as claimed in claim 8, wherein:
 the second magnetic permeable element is plate-shaped;
 the third magnetic permeable element is between the first magnetic permeable element and the second magnetic permeable element; and
 the first magnetic permeable element is affixed to the second magnetic permeable element through the third magnetic permeable element.

10. The optical element driving mechanism as claimed in claim 9, wherein:
 the first magnetic permeable element, the second magnetic permeable element, and the third magnetic permeable element are integrally formed as one piece;
 the third magnetic permeable element is in the first accommodating portion; and
 the third magnetic permeable element has a third magnetic permeable element surface facing the movable portion.

11. The optical element driving mechanism as claimed in claim 10, wherein:
 at least a portion of a first segment of the coil does not overlap the third magnetic permeable element when viewed in a direction that the third axis extends;
 the first segment extends in a direction that is not parallel to the first axis;

a shortest distance between the third magnetic permeable element surface and the coil is different from a shortest distance between the first magnetic permeable element and the coil; and at least a portion of the first magnetic permeable element protrudes from the coil in the direction that the third axis extends.

12. The optical element driving mechanism as claimed in claim 11, further comprising a support assembly;

wherein:

the movable portion is movable relative to the fixed portion through the support assembly;

the support assembly is movable relative to the movable portion or the fixed portion;

the fixed portion further comprises a first supporting portion corresponding to the support assembly;

at least a portion of the first magnetic permeable element overlaps the first supporting portion in the direction that the second axis extends; and the coil surrounds the first supporting portion when viewed along the third axis.

13. The optical element driving mechanism as claimed in claim 12, wherein:

the first supporting portion protrudes from the first surface;

the first supporting portion is adjacent to the first disposing portion;

a maximum length of the first supporting portion is greater than a maximum length of the first disposing portion in the direction that the third axis extends;

a first supporting portion surface of the first supporting portion is not parallel to a first disposing portion surface of the first disposing portion; and the first supporting portion surface of the first supporting portion is not perpendicular to the first disposing portion surface of the first disposing portion.

14. The optical element driving mechanism as claimed in claim 13, wherein:

at least a portion of the coil overlaps the support assembly in the direction that the second axis extends; and a shortest distance between the third magnetic permeable element surface and the coil is greater than a shortest distance between the first magnetic permeable element and the coil.

15. The optical element driving mechanism as claimed in claim 14, wherein the movable portion further comprises:

a first recess, wherein the first magnetic element is disposed in the first recess;

a second recess, wherein the second magnetic element is disposed in the second recess; and a first exposing portion formed on the first top wall.

16. The optical element driving mechanism as claimed in claim 15, wherein:

the first top wall surface and the second top wall surface face different directions;

the third top wall surface and the second top wall surface face opposite directions;

at least a portion of the movable portion overlaps the optical element in the direction that the first axis extends; and the movable portion does not overlap the optical element in the direction that the second axis extends.

17. The optical element driving mechanism as claimed in claim 16, wherein:

the first exposing portion has an opening structure; and at least a portion of the first magnetic element is exposed from the first exposing portion.

18. The optical element driving mechanism as claimed in claim 17, wherein the movable portion further comprises a first adhesive element, and the optical element is affixed on the movable portion through the first adhesive element;

the first adhesive element is in direct contact with the first top wall;

the first adhesive element is in direct contact with the first magnetic element; and the first adhesive element is in direct contact with the optical element.

19. The optical element driving mechanism as claimed in claim 18, wherein:

at least a portion of the first adhesive element is disposed on the first exposing portion; and the first top wall surface is perpendicular to the second top wall surface.

20. The optical element driving mechanism as claimed in claim 8, wherein:

at least a portion of the first magnetic permeable element overlaps the first magnetic element in the direction that the second axis extends;

at least a portion of the first magnetic permeable element overlaps the coil in the direction that the second axis extends;

the first magnetic permeable element is plate-shaped; and the first magnetic permeable element comprises a protruding portion extending in the direction that the first axis extends.

21. An optical element driving mechanism used for driving an optical element, comprising:

a fixed portion;

a movable portion movable relative to the fixed portion and comprising a first top wall, a second top wall protruding from the first top wall, and a third top wall protruding from the first top wall, wherein the optical element is disposed on the first top wall of the movable portion, a first top wall surface of the first top wall faces the optical element, a second top wall surface of the second top wall faces the optical element, and a third top wall surface of the third top wall faces the optical element; and a driving assembly used for driving the optical element to move relative to the fixed portion in a first dimension, wherein the first dimension is rotation relative to a rotational axis parallel to a first axis, wherein the driving assembly comprises:

a coil, wherein a winding axis of the coil is perpendicular to the first axis;

a first magnetic element corresponding to the coil; and a second magnetic element corresponding to the coil, wherein the first top wall is disposed between the first magnetic element and the second magnetic element;

wherein:

the coil does not overlap the first magnetic element and the second magnetic element when viewed along the winding axis.

22. The optical element driving mechanism as claimed in claim 1, wherein the movable portion further comprises a bottom wall, and the first top wall and the bottom wall are disposed on opposite sides of the first magnetic element, wherein the first top wall comprises:

a first extending portion;

a second extending portion connected to the first extending portion; and

a third extending portion connected to the second extending portion, wherein the first extending portion, the second extending portion, and the third extending portion cover a top surface of the first magnetic element, and wherein the second extending portion extends in a direction different from a direction that the first extending portion extends, and different from a direction that the third extending portion extends.

\* \* \* \* \*